United States Patent [19]
Takayasu et al.

[11] Patent Number: 6,007,696
[45] Date of Patent: Dec. 28, 1999

[54] APPARATUS AND METHOD FOR MANUFACTURING ELECTROLYTIC IONIC WATER AND WASHING METHOD USING ELECTROYLTIC IONIC WATER

[75] Inventors: Jun Takayasu, Kawasaki; Naoto Miyashita, Yokohama, both of Japan

[73] Assignee: Kabushiki Kaisha Toshiba, Kawasaki, Japan

[21] Appl. No.: 08/938,150

[22] Filed: Sep. 26, 1997

[30] Foreign Application Priority Data

| Sep. 28, 1996 | [JP] | Japan | 8-277353 |
| Sep. 28, 1996 | [JP] | Japan | 8-277354 |
| Sep. 28, 1996 | [JP] | Japan | 8-277355 |
| Sep. 30, 1996 | [JP] | Japan | 8-276844 |

[51] Int. Cl.$^6$ ................................... C02F 1/461
[52] U.S. Cl. .................. 205/747; 205/760; 204/263; 204/264; 204/294; 134/2
[58] Field of Search ................... 204/263, 264, 204/294, 551; 205/746, 747, 751, 760; 134/2; 210/900

[56] References Cited

U.S. PATENT DOCUMENTS 5,578,193  11/1996  Aoki et al. ................. 205/746
5,593,554   1/1997  Yamanaka et al. .......... 204/263
5,720,869   2/1998  Yamanaka et al. .......... 205/746

*Primary Examiner*—Kathryn Gorgos
*Assistant Examiner*—Thomas H Parsons
*Attorney, Agent, or Firm*—Oblon, Spivak, McClelland, Maier & Neustadt, P.C.

[57] ABSTRACT

Disclosed is an apparatus for manufacturing an electrolytic ionic water for treating a substrate, comprising an electrolytic cell including an anodic chamber and a cathodic chamber partitioned from the anodic chamber by a porous membrane, a first carbon electrode housed in the anodic chamber, a second carbon electrode housed in said cathodic chamber, apparatus for supplying an electrolyte solution prepared by dissolving a supporting electrolyte in pure water or ultra pure water into the electrolytic cell, apparatus for applying a DC voltage between the first and second carbon electrodes and so as to electrolyze the electrolyte solution, thereby to form an oxidizing ionic water in the anodic chamber and a reducing ionic water in the cathodic chamber, a first discharge port for discharging the oxidizing ionic water from within the anodic chamber, and a second discharge port for discharging the reducing ionic water from within the cathodic chamber.

39 Claims, 11 Drawing Sheets

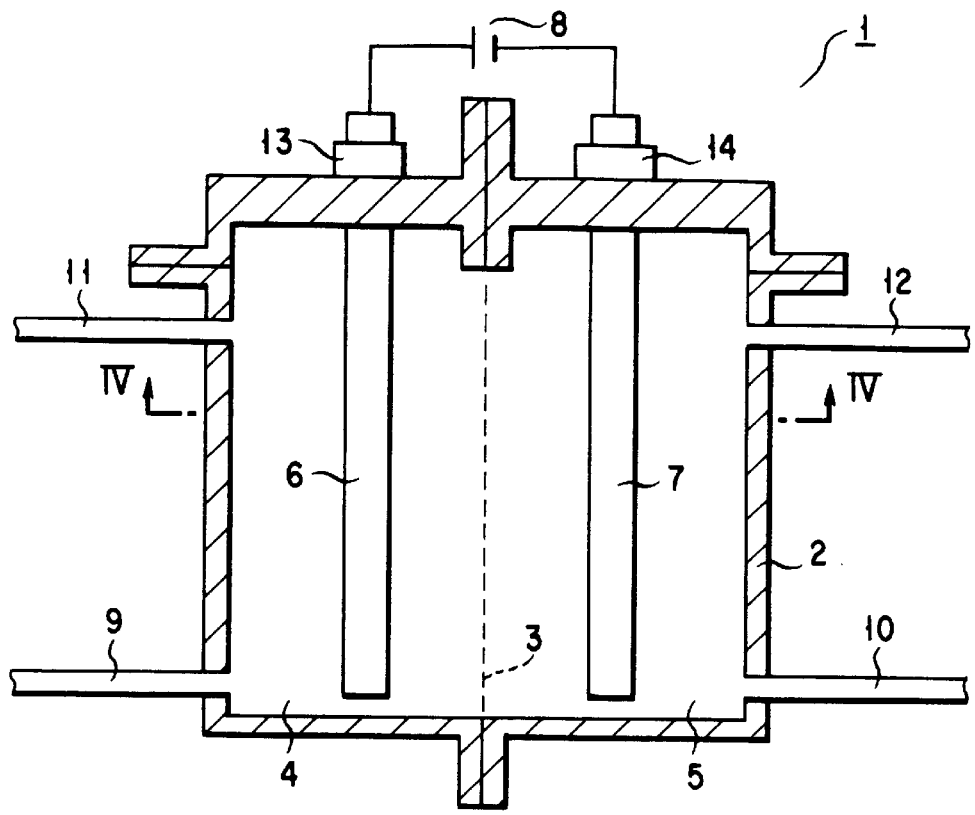
FIG. 2
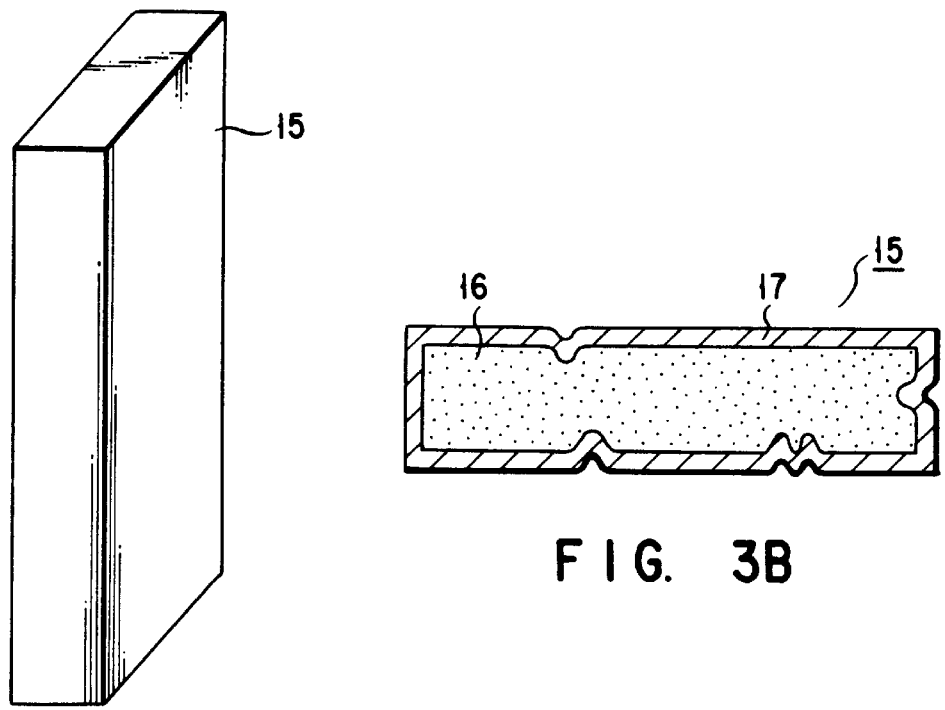
FIG. 3A
FIG. 3B

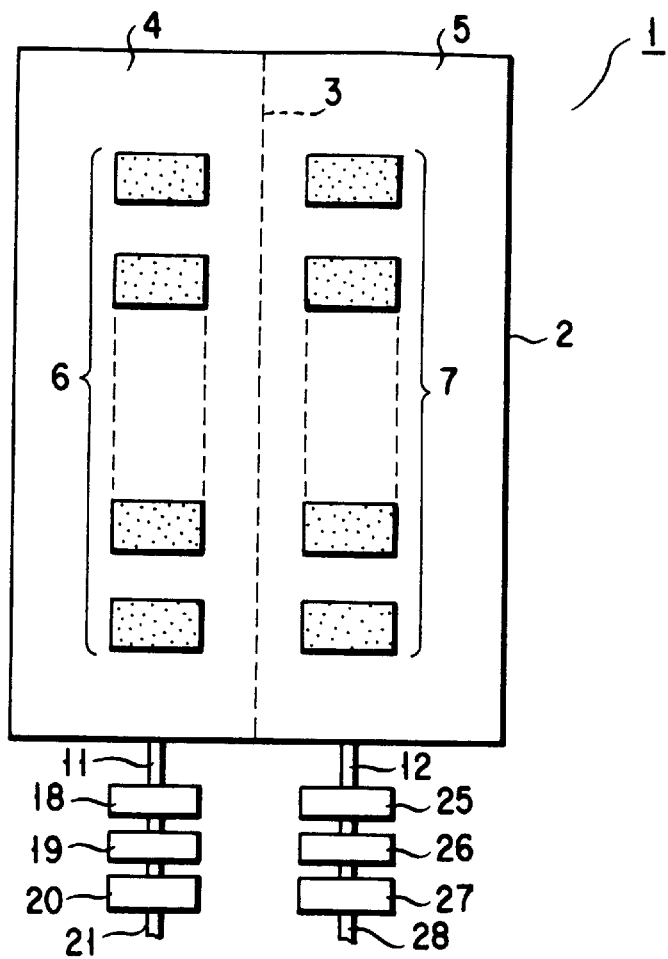
F I G. 6
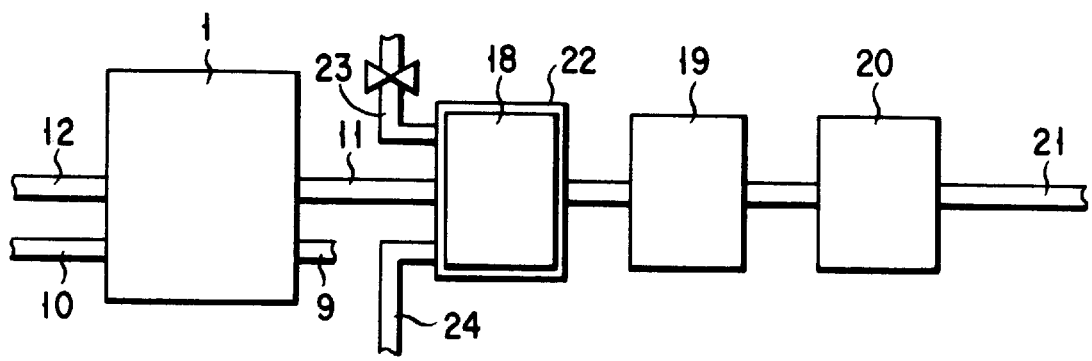
F I G. 7

APPARATUS AND METHOD FOR MANUFACTURING ELECTROLYTIC IONIC WATER AND WASHING METHOD USING ELECTROYLTIC IONIC WATER

BACKGROUND OF THE INVENTION

The present invention relates to an apparatus and method for manufacturing an electrolytic ionic water and a washing method using an electrolytic ionic water, particularly, to an apparatus and method for manufacturing an electrolytic ionic water used for washing substrates of a semiconductor device, a liquid crystal display device, etc. and a method of washing substrates of a semiconductor device, a liquid crystal display device, etc. using an electrolytic ionic water.

It was customary in the past to use a fluorine-containing solvent such as flon for washing or polishing a semiconductor substrate such as a silicon substrate in the manufacture of a semiconductor device or a liquid crystal display device. However, since it is pointed out that the fluorine-containing solvent gives detrimental effects to the living environment, an electrolytic ionic water obtained by electrolyzing pure water or ultra pure water has come to be widely used in place of the fluorine-containing solvent.

Prior Art

FIG. 1 schematically shows a conventional apparatus 101 for manufacturing an electrolytic ionic water. In manufacturing an electrolytic ionic water using the apparatus 101, an electrolyte solution prepared by dissolving a supporting electrolyte such as ammonium chloride in pure water or ultra pure water is supplied through a passageway 109 into an electrolytic cell 102 including an anodic chamber 104 and a cathodic chamber 105 partitioned from the anodic chamber 104 by a porous membrane 103. Then, a DC voltage is applied between an anode 106 electrically connected to the positive electrode of a power source 108 and a cathode 107 electrically connected to the negative electrode of the power source 108. As a result, the electrolyte solution is electrolyzed to form an oxidizing ionic water and a reducing ionic water in the anodic chamber 104 and the cathodic chamber 105, respectively.

Where, for example, the reducing ionic water generated in the cathodic chamber 105 is selectively used for polishing the substrate of a semiconductor device, the reducing ionic water is supplied through a passageway 112 to a polishing cloth (not shown) included in the polishing apparatus. On the other hand, where the oxidizing ionic water is used for polishing the substrate of a semiconductor device, the oxidizing ionic water is supplied through a passageway 111 to the polishing cloth of the polishing apparatus. In short, the conventional apparatus 101 permits simultaneously manufacturing a reducing ionic water and an oxidizing ionic water and also permits selectively using any of the reducing ionic water and the oxidizing ionic water.

Where the electrolytic ionic water thus manufactured contains impurities such as metal ions and fine particles, serious problems are brought about. Specifically, if the semiconductor substrate is washed with the electrolytic ionic water containing impurities, the characteristics of the manufactured semiconductor device are markedly affected adversely, resulting in failure to manufacture semiconductor devices of a uniform quality and, thus, in a low yield. Naturally, the electrolytic ionic water used for washing, etc. of a semiconductor substrate is required to be of a high purity and not to contain impurities such as metal ions and fine particles.

In the conventional method of manufacturing an electrolytic ionic water, the purity of the product electrolytic ionic water was increased by lowering the concentration of the impurities such as metal ions contained in the electrolyte solution supplied to the electrolytic cell 102 and by using a metal electrode which is unlikely to generate metal ions.

To be more specific, a high purity electrolytic ionic water was obtained in the conventional method of manufacturing an electrolytic ionic water by using a high purity pure water or ultra pure water for preparing the electrolyte solution. For example, the high purity pure water used has substantially all the impurities such as ions, fine particles, microorganisms and organic substances removed therefrom and has an electrical resistivity of about 5 to 19 MΩ~cm. Also, the ultra pure water used is prepared by effectively removing the suspended substances and dissolved substances from feed water and has a purity higher than that of the high purity pure water noted above. Further, electrolytes which do not contain a metal such as HCl, $HNO_3$, $NH_4Cl$ and $NH_4F$ were used as a supporting electrolyte for preparing the electrolyte solution. Still further, metals having a high oxidation resistance and unlikely to form metal ions such as platinum and titanium were used for forming the anode 106 and the cathode 107.

However, the metal electrodes of platinum or titanium used as the anode 106 and the cathode 107 are manufactured in general under the air atmosphere and, thus, contain various metal elements as impurities. The impurities contained in the metal electrodes, particularly, the anode 106 are eluted into the electrolyte solution to form metal ions. Since these metal ions are partly migrated from the anodic chamber 104 into the cathodic chamber 105 by the electric field formed within the electrolytic cell 102, the product electrolytic ionic water is caused to contain the metal ions.

Further, even if the metal electrode does not contain impurities, platinum or titanium itself forming the electrode is ionized, with the result that the product electrolytic ionic water is caused to contain metal ions. These problems are also brought about in the case where a metal oxide is used for forming the electrode.

The metal impurities attached to the surface of a semiconductor substrate are removed in general by an HF treatment which permits easily removing metals such as Fe, Al and Na. However, the metals such as Cu, which have an oxidation-reduction potential (ORP) higher than that of hydrogen are unlikely to be removed by the HF treatment, compared with the above-noted metals of Fe, Al, Na, etc. On the contrary, where metal impurities having a high ORP such as Cu are contained in the HF aqueous solution, these metal impurities are adsorbed on the surface of the semiconductor substrate.

It is possible to remove the metal impurities having a high ORP by washing the semiconductor substrate with an electrolytic ionic water prepared by electrolyzing an HF aqueous solution. However, since the HF aqueous solution corrodes the metal electrode to generate metal ions, the metal ion concentration in the electrolytic ionic water is increased, with the result that it was impossible to remove completely the metal impurities from the surface of the semiconductor substrate.

BRIEF SUMMARY OF THE INVENTION

An object of the present invention is to provide an apparatus for manufacturing an electrolytic ionic water, which permits manufacturing an electrolytic ionic water having a high detergency.

Another object is to provide a method of manufacturing an electrolytic ionic water, which permits manufacturing an electrolytic ionic water having a high detergency.

Still another object is to provide a washing method using an electrolytic ionic water having a high detergency.

According to a first aspect of the present invention, which is intended to achieve the above-noted objects, there is provided an apparatus for manufacturing an electrolytic ionic water for treating a substrate, comprising:

an electrolytic cell including an anodic chamber and a cathodic chamber partitioned from the anodic chamber by a porous membrane;

a first carbon electrode housed in the anodic chamber;

a second carbon electrode housed in the cathode chamber;

means for supplying an electrolyte solution prepared by dissolving a supporting electrolyte in pure water or ultra pure water into the electrolytic cell;

means for applying a DC voltage between the first and second carbon electrodes so as to electrolyze the electrolyte solution, thereby to form an oxidizing ionic water in the anodic chamber and a reducing ionic water in the cathodic chamber;

a first discharge port for discharging the oxidizing ionic water from within the anodic chamber; and a second discharge port for discharging the reducing ionic water from within the cathodic chamber.

According to a second aspect of the present invention, there is provided a method of manufacturing an electrolytic ionic water for treating a substrate, comprising the steps of:

preparing an electrolyte solution by adding a supporting electrolyte to pure water or ultra pure water;

supplying the electrolyte solution to an electrolytic cell which is partitioned by a porous membrane into an anodic chamber and a cathodic chamber; and applying a DC voltage between a first carbon electrode housed in the anodic chamber and a second carbon electrode housed in the cathodic chamber so as to electrolyze the electrolyte solution, thereby to form an oxidizing ionic water in the anodic chamber and a reducing ionic water in the cathodic chamber.

Further, according to still another aspect of the present invention, there is provided a method of washing a substrate with an electrolytic ionic water, comprising the steps of:

preparing an electrolyte solution by adding a supporting electrolyte to pure water or ultra pure water;

supplying the electrolyte solution to an electrolytic cell partitioned by a porous membrane into an anodic chamber and a cathodic chamber;

applying a DC voltage between a first carbon electrode housed in the anodic chamber and a second carbon electrode housed in the cathodic chamber so as to electrolyze the electrolyte solution, thereby to form an oxidizing ionic water in the anodic chamber and a reducing ionic water in the cathodic chamber; and washing a substrate with at least one of the oxidizing ionic water and the reducing ionic water.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

Prior Art

FIG. 2 is a cross sectional view showing an apparatus for manufacturing an electrolytic ionic water according to one embodiment of the present invention;

FIGS. 3A and 3B are an oblique view and a cross sectional view, respectively, showing a carbon electrode used in the apparatus of the present invention for manufacturing en electrolytic ionic water;

FIG. 6 schematically shows an apparatus for manufacturing an electrolytic ionic water according to another embodiment of the present invention;

FIG. 7 schematically shows an apparatus for manufacturing an electrolytic ionic water according to another embodiment of the present invention;

DETAILED DESCRIPTION OF THE INVENTION

Figure 1:
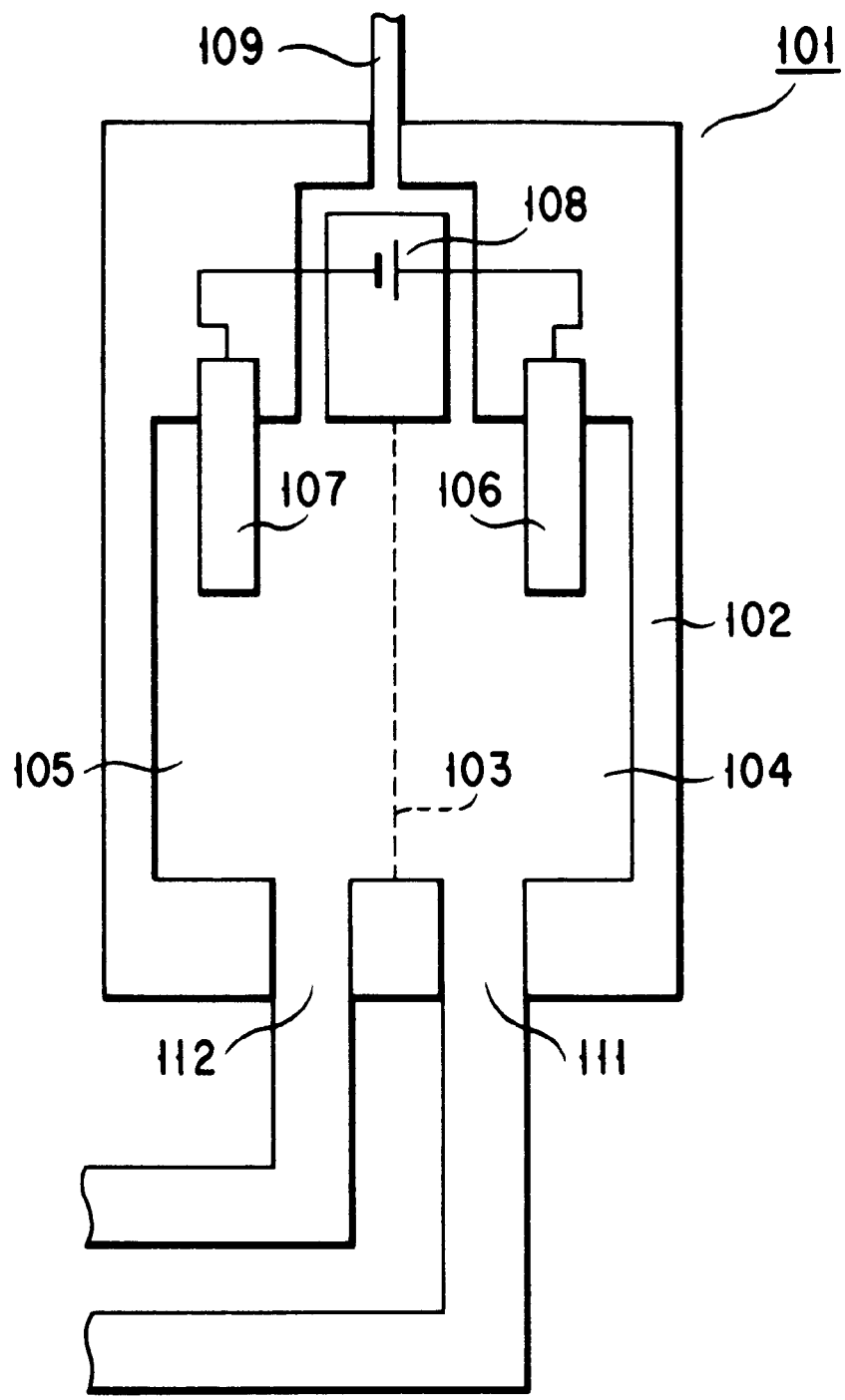
FIG. 1 schematically shows a conventional apparatus for manufacturing an electrolytic ionic water.

Let us describe an apparatus of the present invention for manufacturing an electrolytic ionic water with reference to the accompanying drawings. Specifically, FIG. 2 is a cross sectional view showing an apparatus 1 for manufacturing an electrolytic ionic water according to one embodiment of the present invention. As shown in the drawing, the apparatus 1 comprises an electrolytic cell 2 which is partitioned by a porous membrane 3 into an anodic chamber 4 and a cathodic chamber 5. A first carbon electrode 6 having an end portion fixed to an upper wall of the electrolytic cell 2 by an electrically insulating holder 13 is housed in the anodic chamber 4. Also, a second carbon electrode 7 having an end portion fixed to the upper wall of the electrolytic cell 2 by an electrically insulating holder 14 is housed in the cathodic chamber 5. These first and second carbon electrodes 6, 7 are connected to positive and negative terminals, respectively, of a power source 8.

Fluid passageways 9, 10 are formed through the side wall of the electrolytic cell 2 near the bottom of the cell 2. An electrolyte solution prepared by dissolving a supporting electrolyte in pure water or ultra pure water is supplied into the anodic chamber 4 and cathodic chamber 5 through these passageways 9 and 10, respectively. Further, a first discharge port 11 and a second discharge port 12 are formed through upper portions of the side walls of the anodic chamber 4 and the cathodic chamber 5, respectively.

Pure water having substantially all the ions, fine particles, microorganism and organic substances removed therefrom and having an electrical resistivity of about 5 to 18 MΩ·cm is used for preparing the electrolyte solution. Alternatively, ultra pure water having the impurities such as suspended substances and dissolved substances effectively removed therefrom using an apparatus for manufacturing ultra pure water is used for preparing the electrolyte solution. Naturally, the purity of the ultra pure water is higher than that of the pure water noted above. Further, electrolytes which do not contain a metal such as HF, HCl, HNO$_3$, (COOH)$_2$, NH$_4$Cl and NH$_4$F are used as the supporting electrolyte for preparation of the electrolyte solution.

The same or different electrolyte solutions can be supplied into the anodic camber 4 and the cathodic chamber 5. Where different electrolyte solutions are supplied into the anodic chamber 4 and the cathodic chamber 5, an acidic aqueous solution such as an aqueous solution of HCl should be supplied into the anodic chamber 4. On the other hand, a basic aqueous solution such as an aqueous solution of NH$_4$OH or an aqueous solution containing both an acid such as HCl and a base such as NH$_4$OH should be supplied into the cathodic chamber 5.

The material of the electrolytic cell 2 is not particularly limited. However, it is necessary for at least the inner wall of the cell 2 to exhibit resistance to the electrolyte solution. To be more specific, it is necessary to apply a passivation treatment to the inner wall of the cell 2 with, for example, polytetrafluoroethylene or a high purity alumina, depending on the specific supporting electrolyte used.

It is possible to use, for example, an ion exchange membrane used in the ordinary apparatus for manufacturing an electrolytic ionic water, the membrane consisting of ceramic materials, polymers, etc., as the porous membrane 3 partitioning the electrolytic cell 2. Further, the power source 8 is not particularly limited as far as a DC voltage of about 10 to 20V can be applied between the carbon electrodes 6 and 7.

As described above, the carbon electrodes 6 and 7 are used as the anode and the cathode in the apparatus 1 of the present invention for manufacturing an electrolytic ionic water. Shapes of the carbon electrodes 6, 7 are not particularly limited. For example, each of these carbon electrodes 6, 7 may be plate-like, columnar or rod-like having a polygonal cross section.

These carbon electrodes 6, 7 can be prepared by molding fine particles of crystalline carbon such as graphite, followed by baking the molding at about 1,000 to 1,200° C. for several hours to scores of hours. The resultant carbon electrode is in the form of a porous body having an irregular surface. In other words, each of the carbon electrodes 6 and 7 has a large specific surface area, making it possible to carry out the electrolysis effectively.

It should be noted that the carbon electrode is not dissolved in the electrolyte solution containing, for example, HF and, thus, metal ions are not generated within the electrolytic cell. It follows that metal ions are not eluted from the anode and the cathode in the apparatus 1 of the present invention, with the result that contamination of the resultant electrolytic ionic water need not be worried about.

Further, use of the carbon electrode makes it possible to manufacture an electrolytic ionic water having a high detergency. It should be noted in this connection that metal electrodes were used in the conventional apparatus for manufacturing an electrolytic ionic water, making it impossible to use HF as a supporting electrolyte. As a result, it was impossible in the past to remove completely metals having a low ionization tendency such as Cu from a semiconductor substrate.

On the other hand, the carbon electrode used in the present invention is not dissolved in HF, making it possible to use HF as a supporting electrolyte. The electrolytic ionic water prepared by electrolyzing HF has an oxidation-reduction potential (ORP) higher than that of the ordinary HF aqueous solution and, thus, permits ionizing metal impurities having a high ORP or a low ionization tendency such as Cu. It follows that the metal impurities can be removed completely.

As described above, carbon electrodes are used in the present invention as the anode and the cathode, making it possible to manufacture an electrolytic ionic water exhibiting a detergency markedly higher than that exhibited by the ordinary HF aqueous solution. In the case of using the carbon electrode, chemical reaction (1) given below, which involves oxygen molecules generated by the electrolysis of water, is brought about on the surface of, particularly, the anode:

$$C + O_2 \rightarrow CO_2 \circ \qquad (1)$$

Since the surface of the carbon electrode is corroded as apparent from reaction (1) given above, fine carbon particles are generated in some cases. If a semiconductor substrate or the like is washed with an electrolytic ionic water containing fine carbon particles, the yield tends to be lowered. For preventing the mixing of the fine carbon particles, it is desirable to form a protective layer on the surface of the carbon electrode.

FIGS. 3A and 3B are an oblique view and a cross sectional view, respectively, collectively showing a carbon electrode 15 consisting of a porous crystalline carbon molding 16 and a protective layer 17. As shown in these drawings, the protective layer 17 consisting of an amorphous carbon is formed to cover the surface of the carbon molding 16 in the carbon electrode 15, which is plate-like. Since the protective layer 17 covers the surface of the carbon molding 16, fine carbon particles are unlikely to be generated from the surface of the carbon electrode 15 over a long period of time.

The reason for the particular effect produced by the presence of the protective layer 17 consisting of an amorphous carbon, which has not yet been clarified sufficiently, is considered to be as follows. Specifically, the porous crystalline carbon molding 16 is considered to be an aggregate of fine crystalline carbon particles. In this case, the bonding between adjacent fine particles is not necessarily strong, with the result that the corrosion brought about by the chemical reaction (1) given previously causes the fine carbon particles, which are weakly bonded to each other, to be separated from the carbon molding 16 so as to generate fine carbon particles from the surface of the crystalline carbon molding 16.

However, where the protective layer 17 consisting of an amorphous carbon is formed to cover the surface of the crystalline carbon molding 16 as in the present invention, the carbon molding 16 is not in direct contact with the electrolyte solution. As a result, the carbon molding 16 is not corroded and, thus, fine carbon particles are not generated from the surface of the carbon molding 16. It should be noted that the amorphous carbon forming the protective layer 17 is an aggregate of graphite microcrystals arranged at random and is rich in reactivity, compared with a crystalline carbon. Since the protective layer 17 is formed of an amorphous carbon, which is rich in reactivity and consists of microcrystals, the carbon particles, even if generated by corrosion, are readily converted into a carbon dioxide gas within the electrolyte solution. It follows that fine carbon particles are unlikely to be generated within the electrolytic cell 2.

The carbon electrode 15 can be prepared, for example, as follows. In the first step, fine particles of crystalline carbon such as graphite are molded, followed by baking the molding at about 1,000° to 1,200° C. for several hours to scores of hours to prepare the porous crystalline carbon molding 16, as described previously. Then, the carbon molding 16 is dipped in a dispersion of amorphous carbon powder having a particle diameter smaller than that of the crystalline carbon fine particles to permit the surface of the crystalline carbon molding 16 to be covered with the amorphous carbon powder. The carbon molding 16 covered with the amorphous carbon powder is further baked at about 800° C. to 1,500° C. for 24 hours to 120 hours. As a result, the protective layer 17 consisting of an amorphous carbon is formed to cover the surface of the carbon molding 16. Further, the carbon molding 16 covered with the amorphous carbon is cut into desirable shape and baked at 2,000° C. or higher for purification, thereby producing the carbon electrode 15.

The fine particles of crystalline carbon used for obtaining the carbon molding 16 have in general a particle diameter of 10 μm to 100 μm. In this case, pores sized at several μm to scores of μm are formed on the surface of the crystalline carbon molding 16. On the other hand, the amorphous carbon powder used for forming the protective layer 17 should desirably have a particle diameter of 0.1 μm to 10 μm. In this case, the protective layer 17 is allowed to have a high density.

Alternatively, the protective layer 17 consisting of an amorphous carbon can be prepared by another method such as CVD under a reduced pressure or a vacuum vapor deposition. Regardless of the preparing method, the protective layer 17 should desirably be sufficiently thin. To be more specific, the protective layer 17 should not cover completely the pore formed on the surface of the crystalline carbon molding 16.

In other words, the thickness of the protective layer 17 should desirably be smaller than the diameter of the pore of the carbon molding 16. In this case, the specific surface area of the crystalline carbon molding 16 is not decreased, with the result that the carbon electrode 15 retains its high electrolytic function.

As described above, fine carbon particles can be prevented from being contained in the electrolytic ionic water by forming a protective layer covering the crystalline carbon molding. Alternatively, presence of fine carbon particles in the electrolytic ionic water can be prevented by increasing the concentration of the supporting electrolyte in the electrolyte solution.

Suppose HCl is used as a supporting electrolyte in the conventional method of manufacturing an electrolytic ionic water. In this case, the HCl concentration in the electrolyte solution is lower than about 100 ppm, and reactions (2) and (3) given below take place on the surface of the anode:

(2)

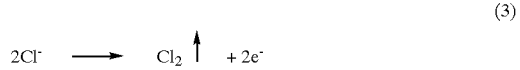

(3)

The oxygen gas generated by reaction (2) corrodes the carbon electrode so as to generate fine carbon particles from the electrode surface. However, if the HCl concentration in the electrolyte solution is increased, the chlorine ion concentration is increased so as to promote reaction (3), while suppressing reaction (2). It follows that the oxygen gas generation is suppressed and, thus, corrosion of the carbon electrode with the oxygen gas is also suppressed, with the result that generation of fine carbon particles from the electrode surface is suppressed.

In order to prevent effectively the carbon electrode from being corroded, the concentration of the supporting electrolyte in the electrolyte solution, which depends on the kind of the supporting electrolyte used, should generally be about 100 ppm to 100,000 ppm. In the case of using HCl, HNO₃, (COOH)₂, NH₄Cl or NH₄F as the supporting electrolyte, the concentration should desirably be about 1,000 ppm to 100,000 ppm. On the other hand, the concentration should desirably be about 100 ppm to 10,000 ppm in the case of using HF as the supporting electrolyte.

Particularly, where HCl is used as the supporting electrolyte, the HCl concentration in the electrolyte solution should desirably fall within a range of between 0.1 and 10% by weight in order to suppress effectively generation of fine carbon particles. As described previously, different electrolyte solutions can be supplied into the anodic chamber 4 and the cathodic chamber 5. Where, for example, an HCl aqueous solution and an NH₄OH aqueous solution are supplied into the anodic chamber 4 and the cathodic chamber 5, respectively, it is desirable to set the $NH_4OH$ concentration lower than the HCl concentration. For example, it is desirable to set the HCl concentration at about 1,000 ppm to 100,000 ppm, with the $Nh_4OH$ concentration set at about 10 ppm to 500 ppm. For increasing the electrical conductivity of the electrolyte solution, an additional HCl aqueous solution may be supplied into the cathodic chamber 5 in a concentration of about 10 ppm to 500 ppm. Further, the pH value of the electrolyte solution should be adjusted at about 8 to 9.

As described above, presence of fine carbon particles in the electrolytic ionic water can be prevented by increasing the concentration of the supporting electrolyte in the electrolyte solution. Further, a filter can be used for preventing fine carbon particles from being contained in the electrolytic ionic water. For example, the fine carbon particles can be removed from the electrolytic ionic water by arranging a filter in the first discharge port 11 or the second discharge port 12.

Figure 4:
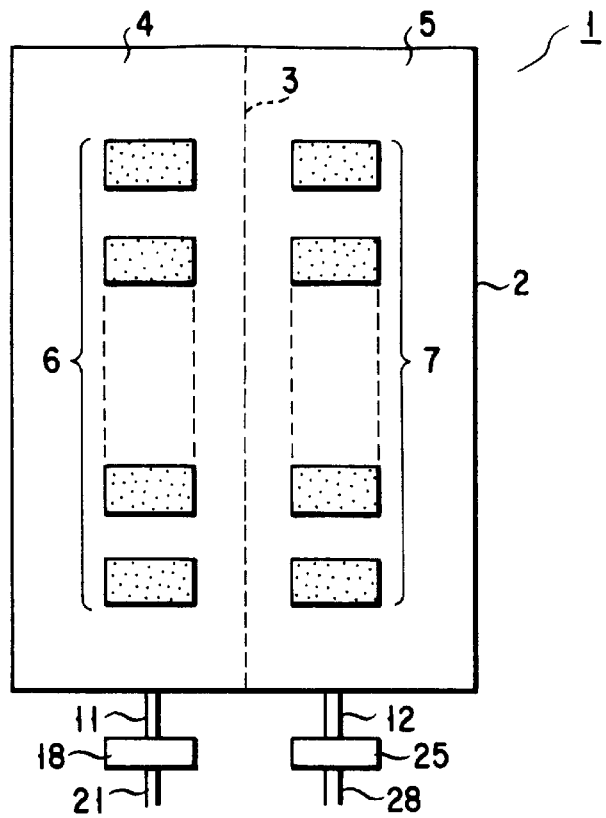
FIG. 4 schematically shows an apparatus for manufacturing an electrolytic ionic water according to another embodiment of the present invention.

FIG. 4, which is a schematic cross sectional view along line IV—IV in FIG. 2, shows that filters 18 and 25 are arranged in the apparatus 1 of the present invention for manufacturing an electrolytic ionic water. In the apparatus shown in FIG. 4, an oxidizing ionic water formed in the anodic chamber 4 is discharged through the first discharge port 11 and, then, passes through the filter 18. Likewise, a reducing ionic water formed in the cathodic chamber 5 is discharged through the second discharge port 12 and, then, passes through the filter 25. It follows that the fine carbon particles present in the anodic chamber 4 and the cathodic chamber 5 are trapped by the filters 18, 25, with the result that the electrolytic ionic water supplied to, for example, a washing apparatus of a semiconductor substrate through fluid passageways 21 and 28 is substantially free from fine carbon particles.

Figure 5:
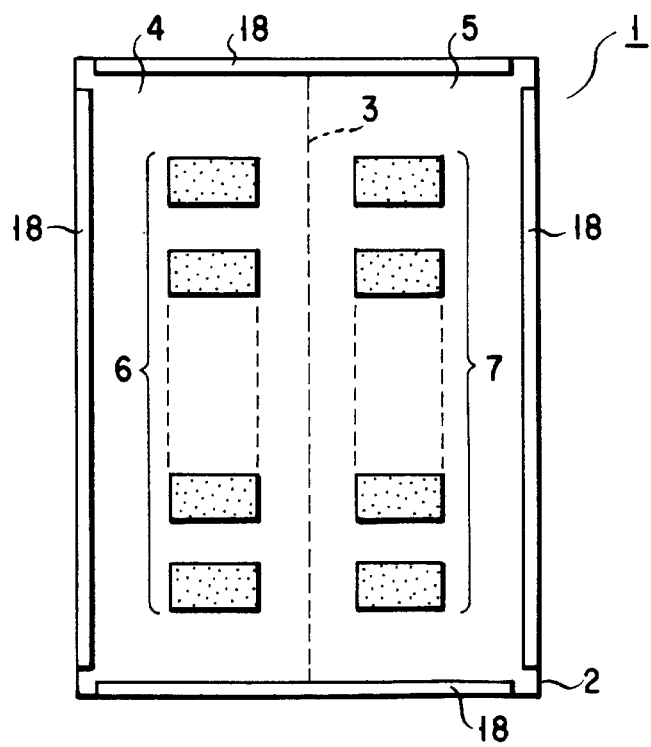
FIG. 5 schematically shows an apparatus for manufacturing an electrolytic ionic water according to another embodiment of the present invention.

Alternatively, the filter 18 can be arranged on the inner wall of the electrolytic cell 2, as shown in FIG. 5. In this case, the electrolytic ionic water within the cell 2 flows through the filter 18 and, then, is discharged to the outside through the first and second discharge ports (not shown) extending through the wall of the cell 2.

The filter used in the present invention is not particularly limited, as far as carbon particles can be removed from the electrolytic ionic water. In general, however, it is desirable to use a plurality of filters having different pore sizes because the fine carbon particles to be removed widely differ from each other in the particle size.

FIG. 6 schematically shows an apparatus for manufacturing an electrolytic ionic water, in which a plurality of filters are used. Specifically, filters 18, 19, 20 are mounted in this order to the first discharge port 11. The filters 18 and 20 have the largest and smallest pore sizes, respectively, with the filter 19 having an intermediate pore size. Likewise, filters 25, 26, 27 are mounted in this order to the second discharge port 12. The filters 25 and 27 have the largest and smallest pore sizes, respectively, with the filter 26 having an intermediate pore size. The oxidizing ionic water formed in the anodic chamber 4 and discharged through the first discharge port 11 passes first through the filter 18, with the result that fine carbon particles having a relatively large particle size are removed from the oxidizing ionic water. Further, the filtrate passes through the filter 19 for removal of fine carbon particles having an intermediate particle size and, then, through the filter 20 for removal of fine carbon particles having a small particle size. It follows that the oxidizing ionic water supplied through the fluid passageway 21 into a washing apparatus (not shown) of a semiconductor substrate is substantially free from fine carbon particles. Similarly, the fine carbon particles contained in the reducing ionic water formed in the cathodic chamber 5 are removed substantially completely by the filters 25, 26, 27 mounted to the second discharge port 12.

As described above, fine carbon particles having various particle sizes can be removed by using a plurality of filters having different pore sizes. In addition, the electrolytic ionic water can be filtered efficiently in the case of using a plurality of filters having different pore sizes, compared with the case of using filters each having a small pore size. However, the filters 18, 19, 20 tend to be plugged relatively easily. Particularly, the filter 18 is most likely to be plugged, leading to a relatively short life. To overcome the difficulty, it is desirable to arrange the filter 18 within a vessel 22 equipped with fluid passageways 23, 24, as shown in FIG. 7. In this modification, pure water or ultra pure water is supplied through the passageway 23 into the vessel 22 and discharged through the passageway 24. As a result, the filter 18 is washed. The life of the filter 18 can be prolonged by periodically applying this washing to the filter 18.

Figure 8:
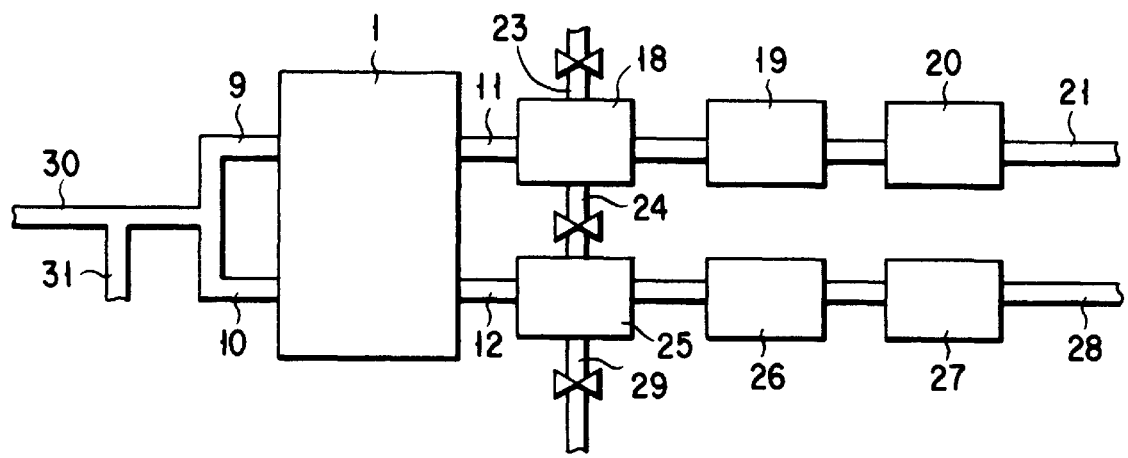
FIG. 8 schematically shows an apparatus for manufacturing an electrolytic ionic water according to another embodiment of the present invention.

FIG. 8 shows another modification. In this case, the filter 18 is interposed between the fluid passageways 23 and 24, with the filter 25 being interposed between the passageways 24 and 29. It follows that the filters 18 and 25 are washed simultaneously by supplying pure water or ultra pure water through the passageway 23 and discharged through the passageway 29.

A reference numeral 30 in FIG. 8 denotes a fluid passageway through which pure water or ultra pure water is supplied into the apparatus 1 for manufacturing an electrolytic ionic water. Also, a reference numeral 31 denotes a fluid passageway for supplying an electrolyte solution of a high concentration into the apparatus 1. In other words, FIG. 8 covers the case where the same electrolyte solution flows through the fluid passageways 9 and 10. Incidentally, the vessel housing the filter is omitted in the drawing of FIG. 8.

Figure 9:
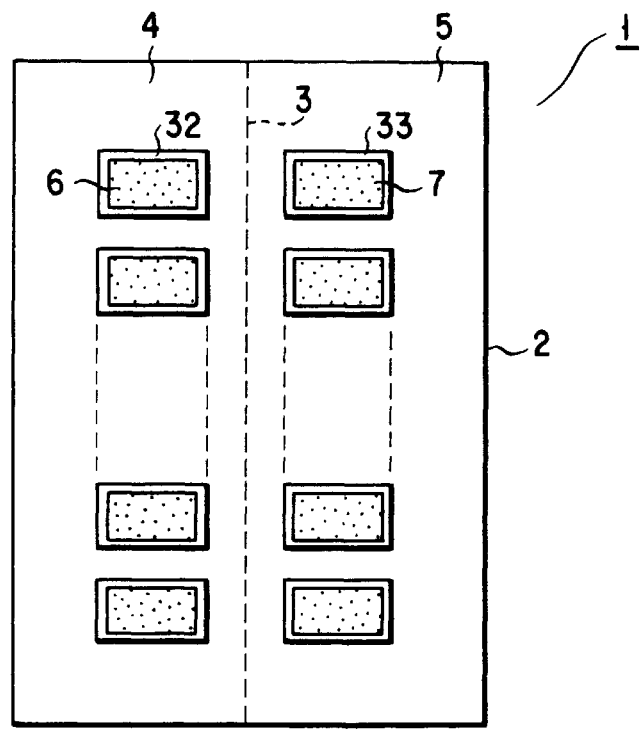
FIG. 9 schematically shows an apparatus for manufacturing an electrolytic ionic water according to another embodiment of the present invention.

The filter for removing the fine carbon particles may be arranged to cover the carbon electrodes 6 and 7, as shown in FIG. 9. Since the carbon electrodes 6 and 7 are covered with cylindrical filters 32 and 33, respectively, as shown in the drawing, fine carbon particles, even if generated from these carbon electrodes 6 and 7, are prevented substantially completely from entering the electrolytic ionic water. However, in the case of using an HF aqueous solution as an electrolyte solution, the electrolytic ionic water generated from the HF aqueous solution is likely to corrode the filter in the vicinity of the carbon electrode. To overcome this difficulty, it is desirable to arrange the filter apart from the carbon electrode.

Figure 10:
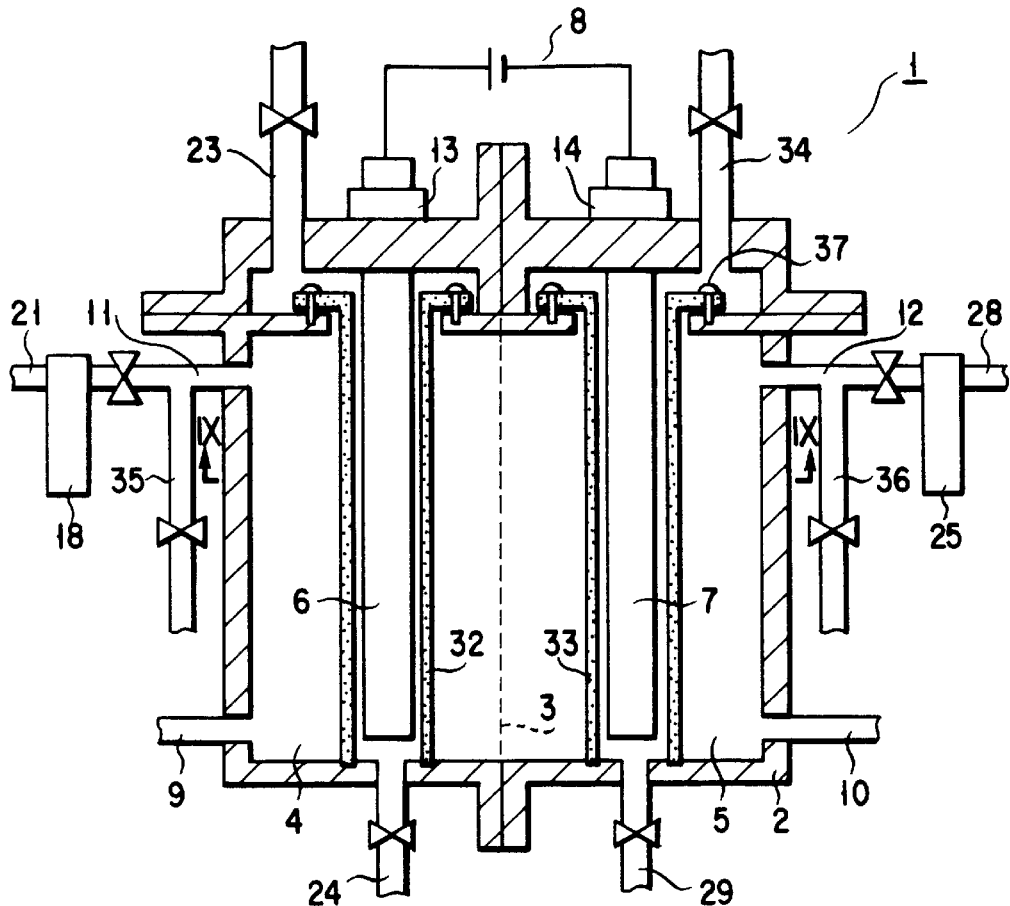
FIG. 10 is a cross sectional view showing an apparatus for manufacturing an electrolytic ionic water according to another embodiment of the present invention.

The various types of the filters described above may be used in combination. Specifically, FIG. 10 is a cross sectional view showing an apparatus for manufacturing an electrolytic ionic water having various types of filters including the cylindrical filters 32 and 33 arranged therein. These cylindrical filters 32, 33 are fixed by screws 37 to the electrolytic cell 2 using packings (not shown).

As shown in the drawing, the carbon filter 6 is covered with the cylindrical filter 32. It should be noted that the inner surface of the cylindrical filter 32 is washed with pure water or ultra pure water supplied through a fluid passageway 23, with the result that the fine carbon particles present inside the cylindrical filter 32 are discharged to the outside through a fluid passageway 24. Likewise, the carbon electrode 7 is covered with the cylindrical filter 33. Also, the inner surface of the cylindrical filter 33 is washed with pure water or ultra pure water supplied through a fluid passageway 34, with the result that the fine carbon particles present inside the cylindrical filter 33 are discharged to the outside through a fluid passageway 29. Incidentally, the carbon electrode 6 and the cylindrical filter 32 are arranged about 3 to 10 mm apart from each other in order to facilitate flow of pure water or ultra pure water. Likewise, the carbon electrode 7 and the cylindrical filter 33 are arranged about 3 to 10 mm apart from each other.

The filters 18 and 25 are also arranged between the first discharge port and the fluid passageway 21 and between the second discharge port and the fluid passageway 28, respectively. It follows that, even if the cylindrical filters 32, 33 fail to remove completely the fine carbon particles present in the electrolytic ionic water, the remaining fine carbon particles are removed substantially completely by these filters 18, 25. Incidentally, an excess electrolytic ionic water is discharged to the outside through fluid passageways 35, 36.

Any type of filter can be used in the present invention as far as fine carbon particles can be removed, and the electrolytic ionic water is not contaminated. For example, it is possible to use a ceramic filter formed by sintering quartz, which is used in a dry filter device.

Figure 11:
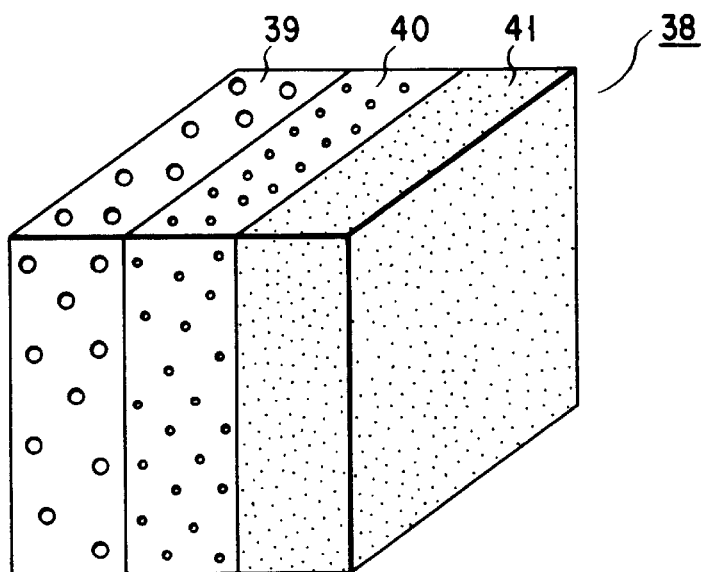
FIG. 11 is an oblique view showing a filter used in an apparatus for manufacturing an electrolytic ionic water according to another embodiment the present invention.

A ceramic filter of a laminate structure can be used in the present invention. FIG. 11 is an oblique view showing a filter 38 of a laminate structure used in the apparatus of the present invention for manufacturing an electrolytic ionic water. As shown in the drawing, the filter 38 consists of a ceramic layer 39 having a large pore size, a ceramic layer 40 having an intermediate pore size, and a ceramic layer 41 having a small pore size, said layers 39, 40, 41 being laminated one upon the other in the order mentioned. Fine carbon particles having various particle diameters can be effectively removed by allowing an electrolytic ionic water to flow through the filter 38 such that the electrolytic water flows into the ceramic layer 39 and comes out of the filter 38 through the ceramic layer 41.

As described above, the electrolytic ionic water can be prevented from containing fine carbon particles by forming a protective layer on the surface of the carbon electrode, by increasing the concentration of the supporting electrolyte in the electrolyte solution, and by using a filter. Further, these measures can be taken in combination.

Specifically, where a protective layer is formed on the surface of the carbon electrode, though the concentration of the supporting electrolyte in the electrolyte solution is not increased and a filter is not used, it is certainly possible to decrease markedly the generation of fine carbon particles. However, if the electrolysis is continued for a long time, the protective layer is consumed, with the result that fine carbon particles tend to be generated. Also, where the concentration of the supporting electrolyte in the electrolyte solution is increased, though a filter is not used and a protective layer is not formed on the surface of the carbon electrode, reaction (3) given previously is rendered predominant. However, since it is impossible to eliminate completely reaction (2) given previously, the surface of the carbon electrode is slightly corroded. Further, where a filter is used, though the concentration of the supporting electrolyte in the electrolyte solution is not increased and a protective layer is not formed on the surface of the carbon electrode, the filter tends to be plugged.

On the other hand, where a filter is used and a protective layer is formed on the surface of the carbon electrode, though the concentration of the supporting electrolyte in the electrolyte solution is not increased, generation of fine carbon particles is markedly suppressed. Also, since the generated fine carbon particles are trapped by the filter, fine carbon particles are removed substantially completely from the electrolytic ionic water. What should also be noted is that, since the amount of the fine carbon particles trapped by the filter is markedly smaller than in the case where the protective layer is not formed on the surface of the carbon electrode, the filter is unlikely to be plugged, leading to a long life of the filter.

The fine carbon particle generation is also suppressed markedly in the case where the concentration of the supporting electrolyte in the electrolyte solution is increased and a filter is used, though a protective layer is not formed on the surface of the carbon electrode. In addition, since the generated fine carbon particles are trapped by the filter, the fine carbon particles are removed substantially completely from the electrolytic ionic water. Further, the life of the filter is prolonged.

Where the concentration of the supporting electrolyte in the electrolyte solution is increased and a protective layer is formed on the surface of the carbon electrode, though a filter is not used, corrosion of the protective layer is markedly suppressed, leading to a long life of the protective layer. It follows that generation of fine carbon particles can be suppressed over a long period of time.

Further, where the concentration of the supporting electrolyte in the electrolyte solution is increased, a filter is used, and a protective layer is formed on the surface of the carbon electrode, the amount of the fine carbon particles contained in the electrolytic ionic solution can be decreased most effectively. In addition, the effect of removing the fine carbon particles can be retained over a long period of time.

As described above, a carbon electrode is used in the apparatus of the present invention for manufacturing an electrolytic ionic water, making it possible to manufacture an electrolytic ionic water which does not contain metallic substances and exhibits a high detergency. Further, the apparatus is enabled to manufacture an electrolytic ionic water which does not contain metallic substances and fine carbon particles and exhibits a high detergency by forming a protective layer on the surface of the carbon electrode, by increasing the concentration of the supporting electrolyte in the electrolyte solution, or by using a filter.

The apparatus of the present invention for manufacturing an electrolytic ionic water is sized relatively small. Specifically, an appropriate size of the apparatus of the present invention, which depends on the size of the carbon electrode and the number of carbon electrodes used, is in general 10 to 30 cm in width, 10 to 30 cm in length, and 20 to 50 cm in height. Therefore, where a large amount of an electrolytic ionic water is required, an apparatus of the size exemplified above is considered not to meet the requirement. In such a case, it is desirable to use a plurality of apparatuses in combination.

Figure 12:
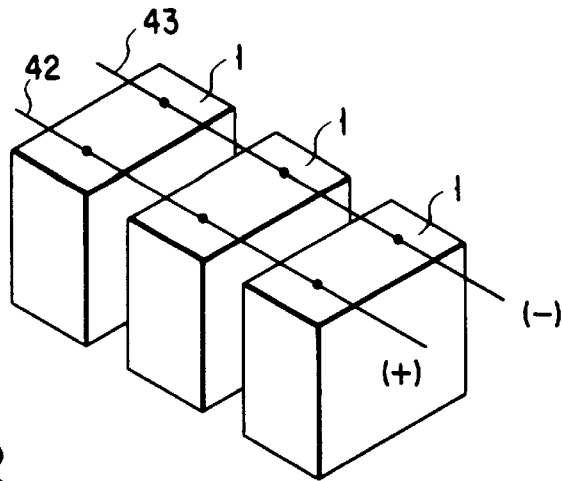
FIG. 12 is an oblique view showing an arrangement of apparatuses for manufacturing an electrolytic ionic water according to another embodiment of the present invention.

FIG. 12 is an oblique view showing an arrangement of a plurality of apparatuses 1 of the present invention for manufacturing an electrolytic ionic water. As shown in the drawing, the anodes of these apparatus 1 are connected to an electric wire 42 connected to the positive terminal of a power source. Likewise, the cathodes of these apparatus 1 are connected to an electric wire 43 connected to the negative terminal of the power source. The particular arrangement makes it possible to control the manufacturing amount of the electrolytic ionic water in accordance with the number of electrolytic ionic water manufacturing apparatuses.

The electrolytic ionic water manufactured by the apparatus of the present invention can be used for the washing of, for example, a semiconductor substrate.

Figure 13:
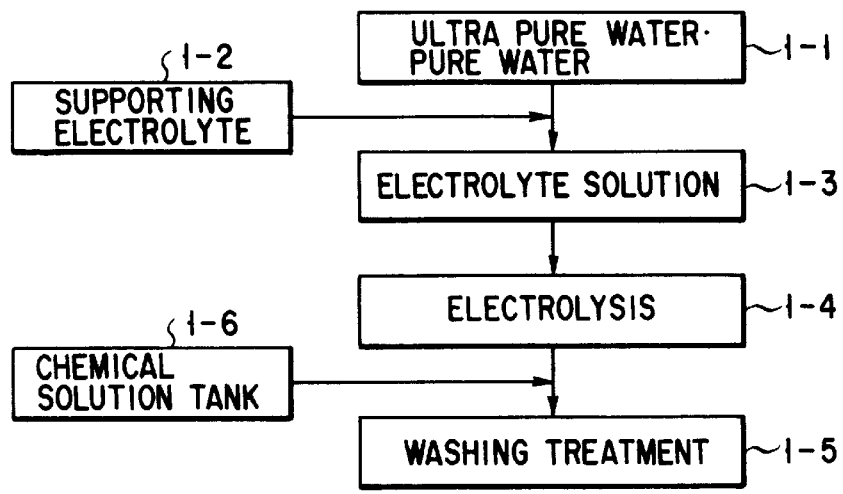
FIG. 13 is a process diagram showing a method of the present invention for manufacturing an electrolytic ionic water.

FIG. 13 is a process diagram exemplifying a series of process steps between the manufacturing step of an electrolytic ionic water and the washing step. In preparing an electrolytic ionic water, an electrolyte solution 1-3 is prepared first by adding a supporting electrolyte 1-2 to pure water or ultra pure water 1-1, as shown in the process diagram. In this step, an aqueous solution of, for example, HCl is used as an electrolyte solution supplied to the anodic chamber. On the other hand, an aqueous solution of $NH_3$, to which HCl is added as required, is used as an electrolyte solution supplied to the cathodic chamber. These electrolyte solutions are subjected to electrolysis 1-4 within the electrolytic cell so as to generate an electrolytic ionic water consisting of an oxidizing ionic water generated in the anodic chamber and a reducing ionic water generated in the cathodic chamber. A chemical solution is supplied, as desired, from a chemical solution tank 1-6 to the electrolytic ionic water thus generated. Specifically, nitric acid, hydrofluoric acid or the like is supplied to the oxidizing ionic water. On the other hand, a surfactant or the like is added to the reducing ionic water. In the next step, the electrolytic ionic water is supplied to an apparatus for washing a semiconductor substrate for the washing treatment 1-5.

Figure 14:
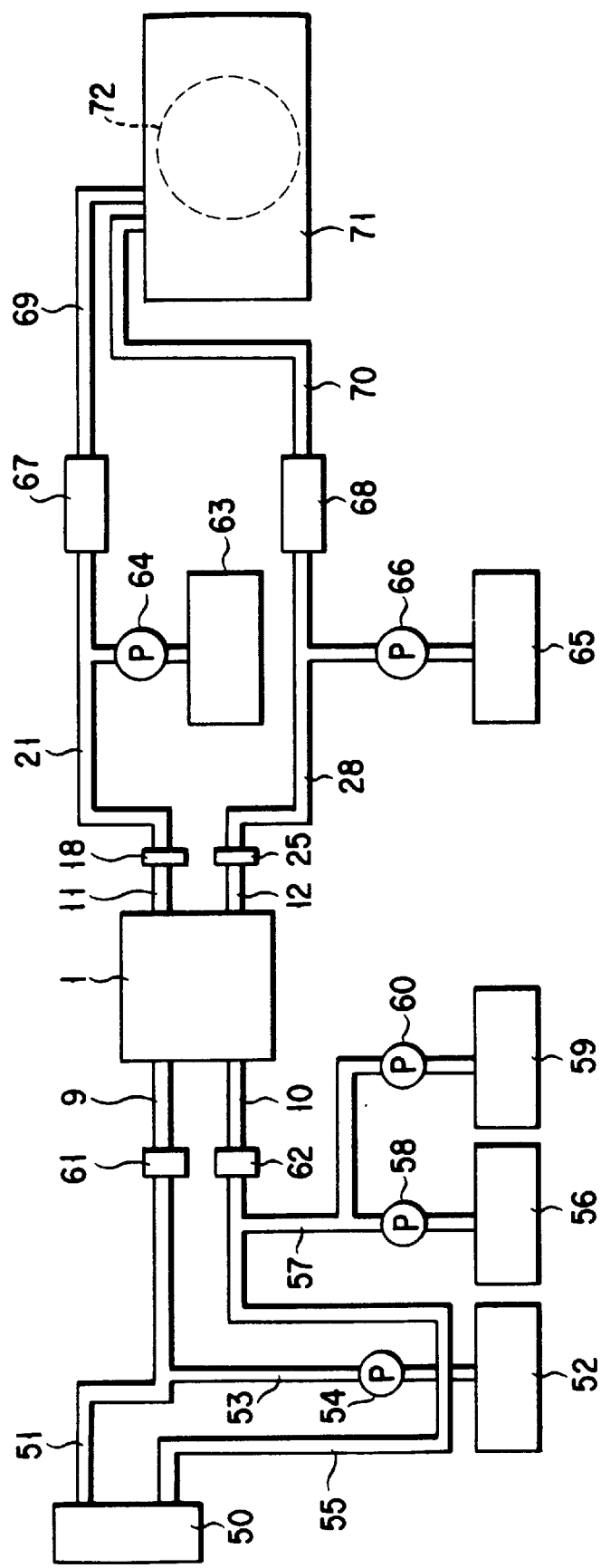
FIG. 14 schematically shows a substrate washing system using the apparatus of the present invention for manufacturing an electrolytic ionic water.

FIG. 14 schematically shows a semiconductor substrate washing system for working the process shown in FIG. 13. As shown in FIG. 14, the washing system comprises a pure water tank 50 housing, for example, ultra pure water, and chemical solution tanks 52, 56, 59. For example, an HCl aqueous solution is housed in the chemical solution tanks 52, 56, with an $Nh_4OH$ aqueous solution being housed in the chemical solution tank 59.

A fluid passageway 53 having one end connected to the chemical solution tank 52 is connected at the other end to a fluid passageway 51 having one end connected to the pure water tank 50. Therefore, a desired amount of the HCl aqueous solution can be added to the ultra pure water by driving a pump 54 mounted to the fluid passageway 53. The ultra pure water having the HCl aqueous solution added thereto is, then, mixed in a mixer 61 and subsequently introduced through a fluid passageway 9 into the anodic chamber of the electrolytic ionic water manufacturing apparatus 1 of the present invention.

A fluid passageway 57 having the chemical solution tanks 56 and 59 connected thereto is connected to a fluid passageway 55, which is connected to the pure water tank 50. Therefore, desired amounts of the HCl aqueous solution and $Nh_4OH$ aqueous solution can be added to the ultra pure water by driving pumps 58 and 60. The ultra pure water having the HCl aqueous solution and $NH_4OH$ aqueous solution added thereto is supplied through a fluid passageway 10 to the cathodic chamber of the electrolytic ionic water manufacturing apparatus 1.

Where the oxidizing ionic water is used for washing a semiconductor substrate 72, the oxidizing ionic water generated in the anodic chamber of the electrolytic ionic water manufacturing apparatus 1 is discharged through the first discharge port 11 and, then, filtered by a filter 18. The filtered oxidizing ionic water is supplied through fluid passageways 21, 69 into a washing apparatus 71 of a semiconductor substrate. In order to remove effectively the particles attached to the surface of the semiconductor substrate 72 and the impurities such as metallic materials contained in the oxidizing ionic water, it is desirable to add a chemical solution containing, for example, hydrofluoric acid, nitric acid or hydrochloric acid to the oxidizing ionic water. In this case, a pump 64 is driven to permit a chemical solution containing, for example, hydrofluoric acid, nitric acid or hydrochloric acid, which is housed in a chemical solution tank 63, to be added to the oxidizing ionic water flowing through a fluid passageway 21. Then, the added chemical solution is mixed sufficiently in a mixer 67 interposed between fluid passageways 21 and 69.

On the other hand, in the case of using the reducing ionic water for washing the semiconductor substrate 72, the reducing ionic water generated in the cathodic chamber of the electrolytic ionic water manufacturing apparatus 1 is discharged through the second discharge port 12 and, then, filtered by a filter 25. The filtered reducing ionic water is supplied to the semiconductor substrate washing apparatus 71 through fluid passageways 28, 70. For washing the semiconductor substrate 72 efficiently, it is desirable to add a chemical solution containing, for example, a surfactant to the reducing ionic water. In this case, a pump 66 is driven to permit a chemical solution containing, for example, a surfactant to be supplied from a chemical solution tank 65 to the reducing ionic water flowing through a fluid passageway 28 and, then, the chemical solution is mixed with the reducing ionic water within a mixer 68 arranged between the fluid passageways 28 and 70.

Any one of the oxidizing ionic water and the reducing ionic water thus prepared is supplied to the semiconductor substrate washing apparatus 71 housing the semiconductor substrate 72 so as to perform the washing treatment.

In general, the chemical solution containing hydrofluoric acid, nitric acid, hydrochloric acid or the like, which is added to the oxidizing ionic water, or the chemical solution containing a surfactant or the like, which is added to the reducing ionic water, is added in an amount of about 0.1 to 5% by weight.

The description given above covers the case where the electrolytic ionic water manufactured in the electrolytic ionic water manufacturing apparatus 1 is used without dilution with pure water or ultra pure water. However, where an electrolyte solution of a high concentration is supplied to the electrolytic ionic water manufacturing apparatus 1, it is possible to dilute the generated electrolytic ionic water.

Figure 15:
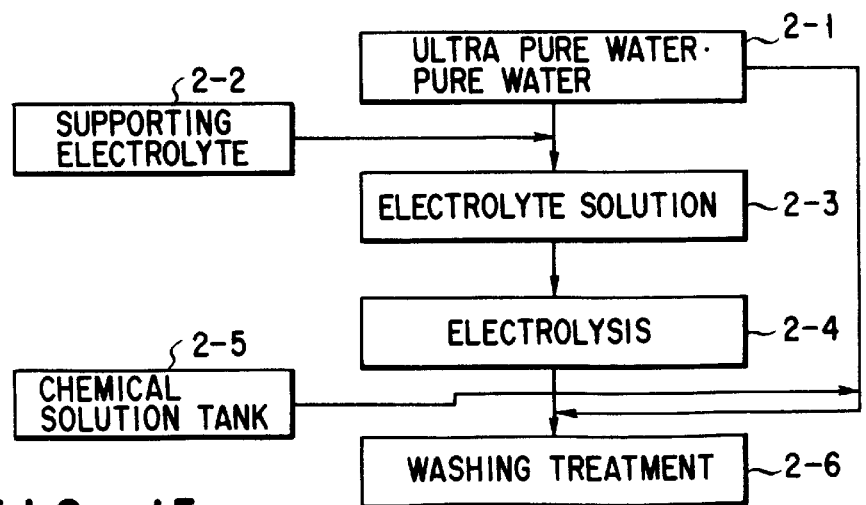
FIG. 15 is a process diagram showing another method of the present invention for manufacturing an electrolytic ionic water.

FIG. 15 is a process diagram showing another example of a series of process steps between the manufacturing step of an electrolytic ionic water and the washing step. In preparing an electrolytic ionic water, an electrolyte solution 2-3 is prepared first by adding a high concentration of a supporting electrolyte 2-2 to pure water or ultra pure water 2-1, as shown in the process diagram. In this step, an aqueous solution of, for example, HCl is used as an electrolyte solution supplied to the anodic chamber. On the other hand, an aqueous solution of $NH_3$, to which HCl is added as required, is used as an electrolyte solution supplied to the cathodic chamber. These electrolyte solutions are subjected to electrolysis 2-4 within the electrolytic cell so as to generate an electrolytic ionic water consisting of an oxidizing ionic water generated in the anodic chamber and a reducing ionic water generated in the cathodic chamber.

The electrolytic ionic water thus generated is diluted with pure water or ultra pure water 2-1. Where a chemical solution is supplied from a chemical solution tank 2-5, the chemical solution may be added after dilution of the electrolytic ionic water with pure water or ultra pure water. Alternatively, a chemical solution diluted with pure water or ultra pure water 2-1 may be added to the electrolytic ionic water. Then, the diluted electrolytic ionic water is supplied to the semiconductor substrate washing apparatus for performing the washing treatment 2-6.

Figure 16:
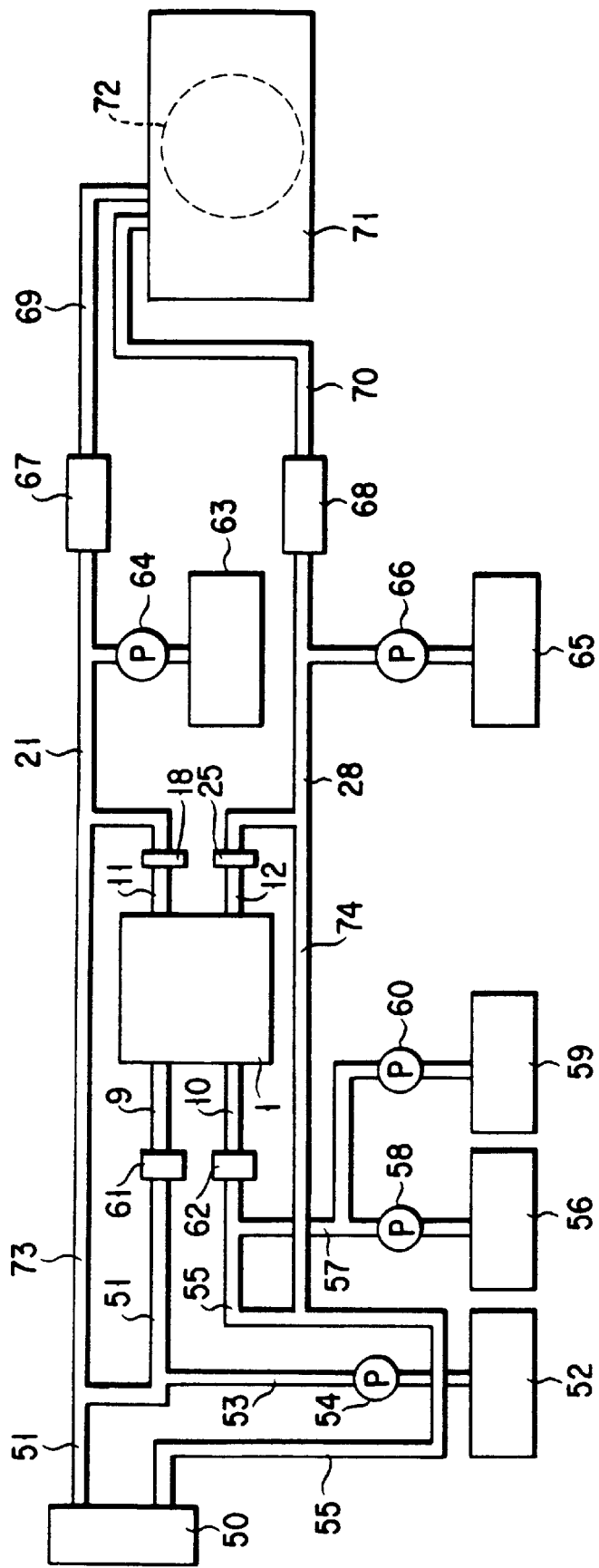
FIG. 16 schematically shows a substrate washing system using the apparatus of the present invention for manufacturing an electrolytic ionic water.

FIG. 16 schematically shows a semiconductor substrate washing system for working the process shown in FIG. 15.

The semiconductor substrate washing system shown in FIG. 16 is substantially equal to that shown in FIG. 14, except that, in the system shown in FIG. 16, each of the fluid passageways 51 and 55 is branched.

Specifically, in the system shown in FIG. 16, the a fluid passageway 73 branched from the fluid passageway 51 is connected to the fluid passageway 21. It follows that the oxidizing ionic water of a high concentration, which is discharged through the first discharge port 11, is diluted with the ultra pure water supplied through the fluid passageway 73. On the other hand, a fluid passageway 74 branched from the fluid passageway 55 is connected to the fluid passageway 28. As a result, the reducing ionic water discharged from the second discharge port 12 is diluted with the ultra pure water supplied through the fluid passageway 74.

The dilution degree should be controlled such that a sufficient washing effect can be ensured and that no damage is to be done to the substrate after the washing. The optimum diluting condition, which is dependent on the substrate to be washed, etc., is that the electrolytic ionic water after dilution should exhibit an oxidation-reduction potential (ORP) of 1000 mV to 1500 mV and a pH value of 1.5 to 5.

As described above, the semiconductor substrate washing system shown in FIG. 16 makes it possible to supply a desired concentration of an electrolytic ionic water having a high detergency to the semiconductor substrate washing apparatus, with the result that the substrate such as a semiconductor substrate can be washed with a high detergency.

EXAMPLE 1

The apparatus for manufacturing an electrolytic ionic water shown in FIG. 2 was used for manufacturing an electrolytic ionic water. In the first step, an aqueous solution of HF containing 500 ppm of HF was prepared by dissolving HF used as a supporting electrolyte in ultra pure water. The HF solution thus prepared was supplied as an electrolyte solution into the anodic chamber 4 and the cathodic chamber 5 through the fluid passageways 9 and 10, respectively. Under this condition, a DC voltage was applied between the carbon electrodes 6 and 7 so as to obtain an electrolytic ionic water consisting of an oxidizing ionic water discharged through the first discharge port 11 and a reducing ionic water discharged through the second discharge port 12.

Figure 17:
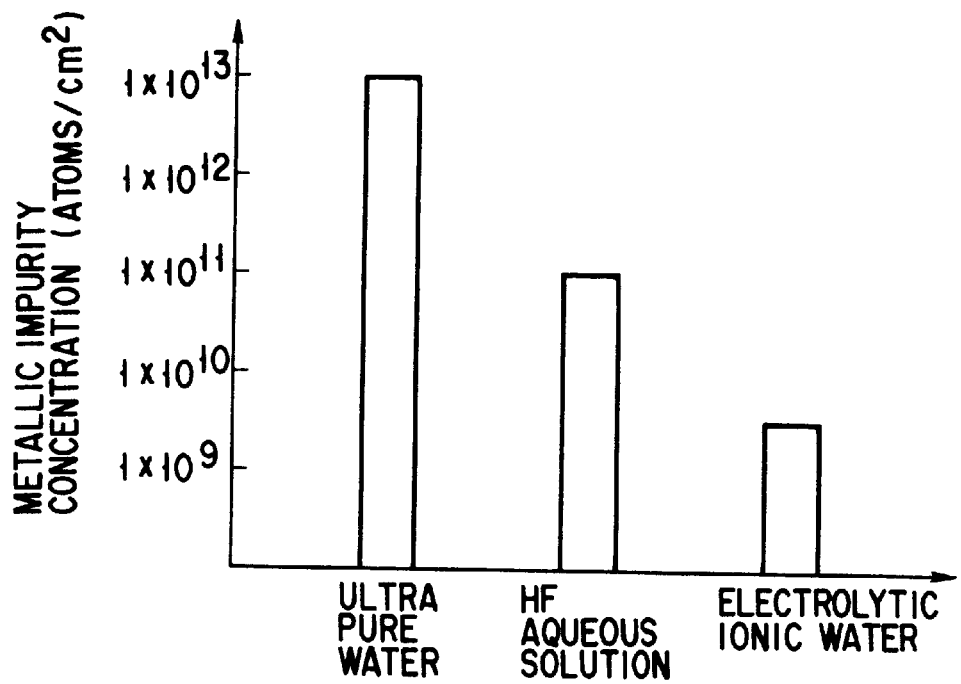
FIG. 17 is a graph showing the detergency of an electrolytic ionic water manufactured by an apparatus according to an Example of the present invention.

Then, the oxidizing ionic water alone was used for washing a semiconductor substrate. Similarly, semiconductor substrates were washed with the ultra pure water used for preparing the electrolytic ionic water and with the HF aqueous solution before the electrolysis. The concentration of the remaining metallic impurities was measured for each of the washed substrates, with the result as shown in the graph of FIG. 17. In this graph, the number of metallic impurity atoms remaining on the washed semiconductor substrate per unit area of the substrate is plotted on the ordinate. As shown in the graph, $1 \times 10^{13}$ impurity atoms/cm$^2$ were found to remain on the substrate in the case of washing with the ultra pure water. Also, $1 \times 10^{11}$ impurity atoms/cm$^2$ were found to remain on the substrate in the case of washing with the HF aqueous solution. On the other hand, the number of metallic impurity atoms remaining on the substrate was found to be about $2 \times 10^9$/cm$^2$ in the case of washing with the oxidizing ionic water included in the electrolytic ionic water manufactured in the present invention. This clearly supports that the oxidizing ionic water manufactured in the present invention permits markedly improving the effect of removing the metallic impurities from the washed substrate.

It should also be noted that, in the case of using the HF aqueous solution, it was impossible to remove completely Cu attached to the semiconductor substrate. However, Cu was removed completely in the case of washing with the oxidizing ionic water. This clearly supports that, since carbon electrodes which are not dissolved in HF are used in the electrolytic ionic water manufacturing apparatus of the present invention, the apparatus of the present invention permits manufacturing an electrolytic ionic water exhibiting a high detergency.

EXAMPLE 2

An electrolytic ionic water was prepared as in Example 1, except that an aqueous solution of HCl prepared by dissolving HCl in ultra pure water was used as an electrolyte solution. In this case, the electrolytic ionic water was allowed to contain 1,000 ppm, 10,000 ppm or 20,000 ppm of HCl. The number of fine particles contained in the electrolytic ionic water thus prepared was measured, with the result as shown in the graph of FIG. 18.

Figure 18:
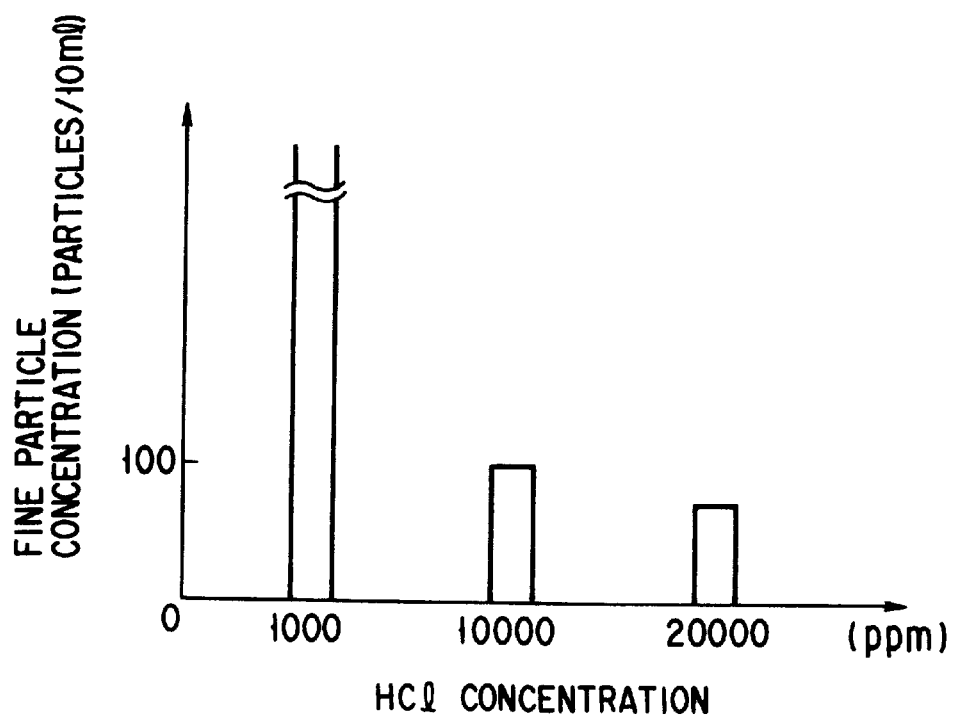
FIG. 18 is a graph showing the number of fine particles contained in an electrolytic water manufactured by an apparatus according to another Example of the present invention.

The number of fine particles per 10 ml of the produced electrolytic ionic water is plotted on the ordinate of the graph in FIG. 18. As shown in the graph, the number of fine particles contained in the electrolytic ionic water is decreased with increase in the HCl concentration of the electrolyte solution. Particularly, the number of fine particles contained in the electrolytic ionic water is markedly decreased where the HCl concentration in the electrolyte solution is 10,000 ppm or higher. This clearly supports that the reaction (2) given previously can be suppressed by increasing the concentration of the supporting electrolyte in the electrolyte solution so as to suppress generation of fine carbon particles.

Incidentally, where the HCl concentration in the electrolyte solution was 1,000 ppm, the number of fine particles contained in the produced electrolytic ionic water was found to be sufficiently smaller than that in the case (not shown) where the HCl concentration in the electrolyte solution was set at several hundreds of ppm.

EXAMPLE 3

Changes with time in the capability of manufacturing an electrolytic ionic water were examined by using the electrolytic ionic water manufacturing apparatus shown in FIG. 10. In this experiment, an electrolytic ionic water was manufactured continuously for measuring the changes with time in the oxidation-reduction potential (ORP) of the manufactured electrolytic ionic water. Also, carbon electrodes each consisting of a porous crystalline carbon molding and a protective layer consisting of an amorphous carbon and covering the surface of the carbon molding were used as the anode and the cathode included in the apparatus. Further, 1,000 ppm of HCl solution was used as the electrolyte solution, which was prepared by dissolving HCl in ultra pure water.

Figure 19:
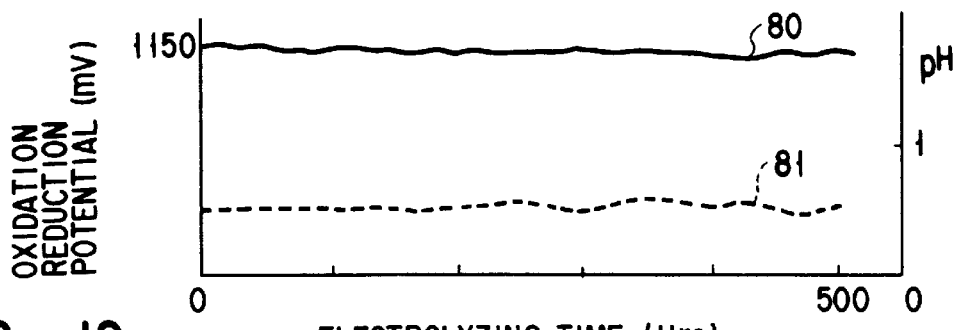
FIG. 19 is a graph showing a life of an apparatus for manufacturing an electrolytic ionic water according to another Example of the present invention.

FIG. 19 is a graph showing the changes with the electrolyzing time in the oxidation-reduction potential (ORP) and the pH value of the manufactured oxidizing ionic water. In this graph, the oxidation-reduction potential and the pH value of the manufactured oxidizing ionic water are plotted on the ordinate. A solid line curve 80 in FIG. 19 represents the data of the oxidation-reduction potential, with a broken line curve 81 denoting the data of the pH value.

As shown in FIG. 19, the oxidation-reduction potential and pH value are left substantially unchanged even after 500 hours of the electrolysis in the manufactured oxidizing ionic water. In other words, the carbon electrodes, etc. were substantially free from a change of state, clearly supporting that the apparatus of the present invention permits manufacturing an electrolytic ionic water exhibiting a high detergency over a long period of time.

EXAMPLE 4

Figure 20:
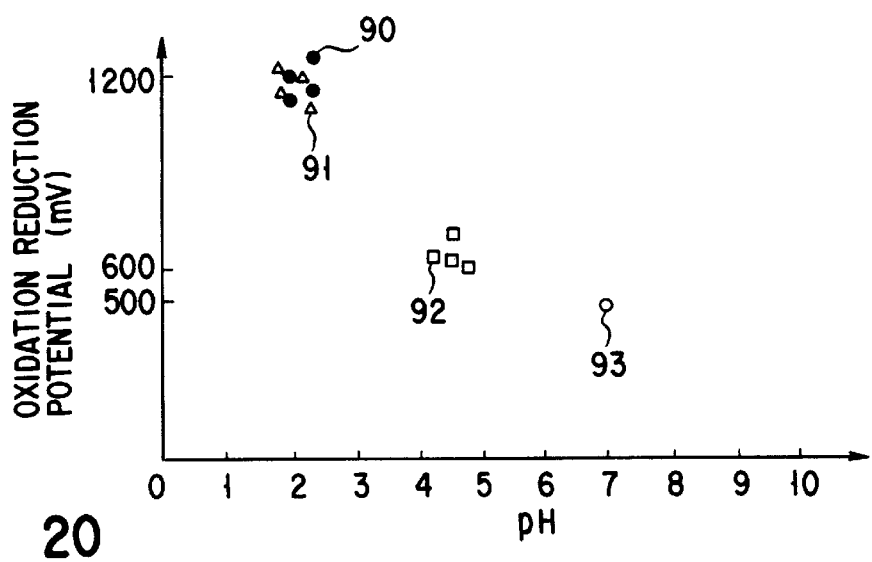
FIG. 20 is a graph showing the relationship between the pH value and an oxidation-reduction potential (ORP) in respect of an electrolytic ionic water manufactured by an apparatus according to another Example of the present invention.

An oxidizing ionic water was produced substantially as in Example 3, and the oxidation-reduction potential of the produced oxidizing ionic water was measured. This experiment also covered the cases where the produced oxidizing ionic water was diluted with 10 times as much as ultra pure water and with 100 times as much as ultra pure water for measuring the oxidation-reduction potential. FIG. 20 is a graph showing the experimental data.

In the graph of FIG. 20, the pH value is plotted on the abscissa, with the oxidation-reduction potential being plotted on the ordinate. Reference numerals 90, 91, 92 shown in the graph cover the cases where the oxidizing ionic water was not diluted, diluted with 10 times as much as ultra pure water and diluted with 100 times as much as ultra pure water, respectively. Further, reference numeral 93 denotes the data on the ultra pure water. As shown in FIG. 20, the undiluted oxidizing ionic water and the oxidizing ionic water diluted with 10 times as much as ultra pure water were found to be substantially equal to each other in the oxidation-reduction potential.

Figure 21:
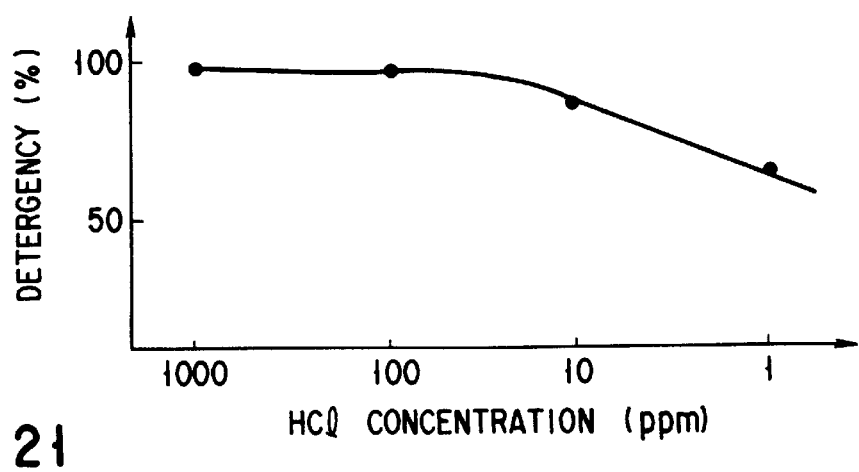
FIG. 21 is a graph showing the relationship between the HCl concentration and the detergency in respect of an electrolytic ionic water manufactured by an apparatus according to still another Example of the present invention.

Then, an oxidizing ionic water each containing 100 ppm, 10 ppm and 1 ppm of HCl was prepared by diluting an oxidizing ionic water containing 1,000 ppm of HCl. A semiconductor substrate was washed with the oxidizing ionic water, followed by measuring the amount of the metallic impurities remaining on the semiconductor substrate after the washing. FIG. 21 is a graph showing the experimental data.

In the graph of FIG. 21, the HCl concentration in the oxidizing ionic water is plotted on the abscissa. On the other hand, the percentage of the metallic impurity removal based on the amount of the metallic impurities contained in the semiconductor substrate before the washing is plotted on the ordinate. It should be noted that carbon electrodes are used in the apparatus of the present invention as both anode and cathode, making it possible to manufacture an electrolytic ionic water which does not contain a metal. As a result, the electrolytic ionic water exhibits a high detergency even if the HCl concentration of the electrolytic ionic water is lowered to about 100 ppm.

As described above, carbon electrodes are used in the apparatus of the present invention as both anode and cathode, with the result that the manufactured electrolytic ionic water is not contaminated with a metal. It follows that the present invention permits providing an electrolytic ionic water exhibiting a high detergency.

As pointed out previously, fine carbon particles are likely to be generated from the carbon electrode. In the present invention, however, the fine carbon particles are prevented from entering the produced electrolytic ionic water by forming a protective layer on the surface of the carbon electrode, by increasing the concentration of the supporting electrolyte in the electrolyte solution, or by using a filter. It follows that an electrolytic ionic water exhibiting a high detergency can be manufactured over a long period of time.

It should also be noted that the electrolytic ionic water produced in the present invention can be used for washing substrates such as a semiconductor substrate so as to remove efficiently the metallic impurities attached to or contained in the substrate. In other words, the substrate can be washed with a high detergency, making it possible to manufacture semiconductor devices of a uniform quality and, thus, to improve the yield.

Incidentally, the electrolytic ionic water manufacturing apparatus, the electrolytic ionic water manufacturing method and the washing method using the electrolytic ionic water were described hereinabove in conjunction with washing of a semiconductor substrate. However, the technical idea of the present invention can also be employed for the washing of, for example, a substrate of a liquid crystal display device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An apparatus for manufacturing an electrolytic ionic water for treating a substrate, comprising:
   an electrolytic cell including an anodic chamber and a cathodic chamber partitioned from said anodic chamber by a porous membrane;
   a first carbon electrode housed in the anodic chamber;
   a second carbon electrode housed in the cathodic chamber;
   a supplying unit configured to supply an electrolyte solution prepared by dissolving a supporting electrolyte in pure water or ultra pure water into the electrolytic cell;
   an applying unit configured to apply a DC voltage between the first and second carbon electrodes so as to electrolyze the electrolyte solution, thereby to form an oxidizing ionic water in the anodic chamber and a reducing ionic water in the cathodic chamber;
   a first discharge port for discharging the oxidizing ionic water from within the anodic chamber; and
   a second discharge port for discharging the reducing ionic water from within the cathodic chamber,
   wherein each of said first and second carbon electrodes comprises a porous crystalline carbon molding and a protective layer formed of an amorphous carbon and covering the surface of said crystalline carbon molding.

2. The apparatus according to claim 1, wherein said electrolyte solution includes an acidic electrolyte solution and a basic electrolyte solution, and said supplying unit comprises a first supplying unit configured to supply said acidic electrolyte solution into the anodic chamber and a second supplying unit configured to supply a basic electrolyte solution into the cathodic chamber.

3. The apparatus according to claim 2, wherein said first supplying unit comprises a first vessel for housing pure water or ultra pure water and a second vessel for housing an HCl aqueous solution, and said second supply means comprises a third vessel for housing pure water or ultra pure water and a fourth vessel housing an ammonia water.

4. The apparatus according to claim 3, wherein said second supplying unit further comprises a fifth vessel for housing an HCl aqueous solution.

5. The apparatus according to claim 1, further comprising an electrolytic ionic water supplying unit connected to one of said first and second discharge ports and configured to supply said oxidizing or reducing ionic water to a substrate washing unit configured to wash a substrate.

6. The apparatus according to claim 1, further comprising a filtering unit configured to filter at least one of said oxidizing ionic water and reducing ionic water.

7. The apparatus according to claim 6, wherein said filtering unit consists of a plurality of filters having different pore sizes and arranged to permit at least one of the oxidizing ionic water and the reducing ionic water to flow successively through the filter having the largest pore size and, then, through the filters having gradually diminished pore sizes.

8. The apparatus according to claim 1, wherein said supporting electrolyte is HF, and said supplying unit comprises a vessel for housing said electrolyte solution.

9. The apparatus according to claim 1, wherein said supporting electrolyte comprises HCl, and said supplying unit comprises a first vessel for housing pure water or ultra pure water and a second vessel for housing an HCl aqueous solution.

10. The apparatus according to claim 1, further comprising an adding unit configured to add an acidic aqueous solution to said oxidizing ionic water.

11. The apparatus according to claim 1, further comprising an adding unit configured to add an aqueous solution containing a surfactant to said ionic reducing ionic water.

12. A method of manufacturing an electrolytic ionic water for treating a substrate, comprising the steps of:
preparing an electrolyte solution by adding a supporting electrolyte to pure water or ultra pure water;
supplying said electrolyte solution to an electrolytic cell which is partitioned by a porous membrane into an anodic chamber and a cathodic chamber; and
applying a DC voltage between a first carbon electrode housed in the anodic chamber and a second carbon electrode housed in the cathodic chamber so as to electrolyze the electrolyte solution, thereby to form an oxidizing ionic water in the anodic chamber and a reducing ionic water in the cathodic chamber,
wherein each of said first and second carbon electrodes comprises a porous crystalline carbon molding and a protective layer formed of an amorphous carbon and covering the surface of said crystalline carbon molding.

13. The method according to claim 12, wherein said electrolyte solution contains a supporting electrolyte at a concentration of 100 ppm to 10,000 ppm.

14. The method according to claim 12, wherein said supporting electrolyte comprises HF.

15. The method according to claim 12, wherein said electrolyte solution contains a supporting electrolyte at a concentration of 1,000 ppm to 100,000 ppm.

16. The method according to claim 12, wherein said supporting electrolyte comprises HCl.

17. The method according to claim 12, wherein said electrolyte solution includes an acidic electrolyte solution, which is supplied into said anodic chamber, and a basic electrolyte solution, which is supplied into said cathodic chamber.

18. The method according to claim 17, wherein said acidic electrolyte solution includes HCl and said basic electrolyte solution includes ammonia.

19. The method according to claim 18, wherein said basic electrolyte solution includes HCl.

20. The method according to claim 12, further comprising a step of allowing at least one of said oxidizing ionic water and said reducing ionic water to flow through a filtering unit.

21. The method according to claim 20, wherein said filtering step is carried out by using a filtering unit consisting of a plurality of filters having different pore sizes and arranged to permit at least one of the oxidizing ionic water and the reducing ionic water to flow successively through the filter having the largest pore size and, then, through the filters having gradually diminished pore sizes.

22. The method according to claim 12, further comprising the step of diluting at least one of said oxidizing ionic water and said reducing ionic water with pure water or ultra pure water.

23. The method of washing a substrate with an electrolytic ionic water, comprising the steps of:
preparing an electrolyte solution by adding a supporting electrolyte to pure water or ultra pure water;
supplying said electrolyte solution to an electrolytic cell partitioned by a porous membrane into an anodic chamber and a cathodic chamber;
applying a DC voltage between a first carbon electrode housed in the anodic chamber and a second carbon electrode housed in the cathodic chamber so as to electrolyze the electrolyte solution, thereby to form an oxidizing ionic water in the cathodic chamber and a reducing ionic water in the anodic chamber; and
washing a substrate with at least one of the oxidizing ionic water and the reducing ionic water,
wherein each of said first and second carbon electrodes comprises a porous crystalline carbon molding and a protective layer formed of an amorphous carbon and covering the surface of said crystalline carbon molding.

24. The method according to claim 23, wherein said electrolyte solution contains a supporting electrolyte at a concentration of 100 ppm to 10,000 ppm.

25. The method according to claim 24, wherein said supporting electrolyte comprises HF.

26. The method according to claim 23, wherein said electrolyte solution contains a supporting electrolyte at a concentration of 1,000 ppm to 100,000 ppm.

27. The method according to claim 24, wherein said supporting electrolyte comprises HCl.

28. The method according to claim 23, wherein said electrolyte solution includes an acidic electrolyte solution, which is supplied into said anodic chamber, and a basic electrolyte solution, which is supplied into said cathodic chamber.

29. The method according to claim 28, wherein said acidic electrolyte solution includes HCl and said basic electrolyte solution includes ammonia.

30. The method according to claim 29, wherein said basic electrolyte solution includes HCl.

31. The method according to claim 23, further comprising a step of allowing, before said washing step, at least one of said oxidizing ionic water and said reducing ionic water to flow through a filtering unit.

32. The method according to claim 31, wherein said filtering step is carried out by using a filtering unit consisting of a plurality of filters having different pore sizes and arranged to permit at least one of the oxidizing ionic water and the reducing ionic water to flow successively through the filter having the largest pore size and, then, through the filters having gradually diminished pore sizes.

33. The method according to claim 23, further comprising the step of diluting, before said washing step, at least one of said oxidizing ionic water and said reducing ionic water with pure water or ultra pure water.

34. An apparatus for manufacturing an electrolytic ionic water for treating a substrate, comprising:
an electrolytic cell including an anodic chamber and cathodic chamber partitioned from said anodic chamber by a porous membrane;
a first carbon electrode housed in the anodic chamber;
a second carbon electrode housed in the cathodic chamber;
a supplying unit configured to supply an electrolyte solution prepared by dissolving a supporting electrolyte in pure water or ultra pure water into the electrolytic cell;

an applying unit configured to apply a DC voltage between the first and second carbon electrodes so as to electrolyze the electrolyte solution, thereby to form an oxidizing ionic water in the anodic chamber and a reducing ionic water in the cathodic chamber;

a first discharge port for discharging the oxidizing ionic water from within the anodic chamber;

a second discharge port for discharging the reducing ionic water from within the cathodic chamber; and a filtering unit configured to filter at least one of said oxidizing ionic water and reducing ionic water, wherein said filtering unit consists of a plurality of filters having different pore sizes and arranged to permit at least one of the oxidizing ionic water and the reducing ionic water to flow successively through the filter having the largest pore size and, then, through the filters having gradually diminished pore sizes.

35. A method of manufacturing an electrolytic ionic water for treating a substrate, comprising the steps of:

preparing an electrolyte solution by adding a supporting electrolyte to pure water or ultra pure water;

supplying said electrolyte solution to an electrolytic cell which is partitioned by a porous membrane into an anodic chamber and a cathodic chamber;

applying a DC voltage between a first carbon electrode housed in the anodic chamber and a second carbon electrode housed in the cathodic chamber so as to electrolyze the electrolyte solution, thereby to form an oxidizing ionic water in the anodic chamber and a reducing ionic water in the cathodic chamber; and allowing at least one of said oxidizing ionic water and said reducing ionic water to flow through a filtering unit, wherein said filtering step is carried out by using a filtering unit consisting of a plurality of filters having different pore sizes and arranged to permit at least one of the oxidizing ionic water and the reducing ionic water to flow successively through the filter having the largest pore size and, then, through the filters having gradually diminished pore sizes.

36. A method of washing a substrate with an electrolytic ionic water, comprising the steps of:

preparing an electrolyte solution by adding a supporting electrolyte to pure water or ultra pure water;

supplying said electrolyte solution to an electrolytic cell partitioned by a porous membrane into an anodic chamber and a cathodic chamber;

applying a DC voltage between a first carbon electrode housed in the anodic chamber and a second carbon electrode housed in the cathodic chamber so as to electrolyze the electrolyte solution, thereby to form an oxidizing ionic water in the cathodic chamber and a reducing ionic water in the anodic chamber;

washing a substrate with at least one of the oxidizing ionic water and the reducing ionic water; and allowing, before said washing step, at least one of said oxidizing ionic water and said reducing ionic water to flow through a filtering unit, wherein said filtering step is carried out by using a filtering unit consisting of a plurality of filters having different pore sizes and arranged to permit at least one of the oxidizing ionic water and the reducing ionic water to flow successively through the filter having the largest pore size and, then, through the filters having gradually diminished pore sizes.

37. An apparatus for manufacturing an electrolytic ionic water for treating a substrate, comprising:

an electrolytic cell including an anodic chamber and cathodic chamber partitioned from said anodic chamber by a porous membrane;

a first carbon electrode housed in the anodic chamber;

a second carbon electrode housed in the cathodic chamber;

a supplying unit configured to supply an electrolyte solution prepared by dissolving a supporting electrolyte in pure water or ultra pure water into the electrolytic cell;

an applying unit configured to apply a DC voltage between the first and second carbon electrodes so as to electrolyze the electrolyte solution, thereby to form an oxidizing ionic water in the anodic chamber and a reducing ionic water in the cathodic chamber;

a first discharge port for discharging the oxidizing ionic water from within the anodic chamber;

a second discharge port for discharging the reducing ionic water from within the cathodic chamber;

a filtering unit for filtering at least one of said oxidizing ionic water and reducing ionic water;

a first fluid passage way connected to the first discharge port;

a second fluid passage way connected to the second discharge port; and a third fluid passage way connected to one of the first and second passage ways, said third fluid passage way supplying pure water or ultra pure water into said one of the first and second passage ways, thereby diluting one of said oxidizing ionic water and said reducing ionic water with pure water or ultra pure water.

38. A method of manufacturing an electrolytic ionic water for treating a substrate, comprising the steps of:

preparing an electrolyte solution by adding a supporting electrolyte to pure water or ultra pure water;

supplying said electrolyte solution to an electrolytic cell which is partitioned by a porous membrane into an anodic chamber and a cathodic chamber;

applying a DC voltage between a first carbon electrode housed in the anodic chamber and a second carbon electrode housed in the cathodic chamber so as to electrolyze the electrolyte solution, thereby to form an oxidizing ionic water in the anodic chamber and a reducing ionic water in the cathodic chamber; and diluting at least one of said oxidizing ionic water and said reducing ionic water with pure water or ultra pure water.

39. A method of washing substrate with an electrolytic ionic water, comprising the steps of:

preparing an electrolyte solution by adding a supporting electrolyte to pure water or ultra pure water;

supplying said electrolyte solution to an electrolytic cell partitioned by a porous membrane into an anodic chamber and a cathodic chamber;

applying a DC voltage between a first carbon electrode housed in the anodic chamber and a second carbon electrode housed in the cathodic chamber so as to electrolyze the electrolyte solution, thereby to form an oxidizing ionic water in the cathodic chamber and a reducing ionic water in the anodic chamber;

washing a substrate with at least one of the oxidizing ionic water and the reducing ionic water; and diluting, before said washing step, at least one of said oxidizing ionic water and said reducing ionic water with pure water or ultra pure water.

* * * * *